(12) United States Patent
Hahn et al.

(10) Patent No.: US 12,333,149 B2
(45) Date of Patent: Jun. 17, 2025

(54) SSD OPTIMIZATION AWARENESS TO ATOMICITY OF DIFFERENT SYSTEM FILES

(71) Applicant: Western Digital Technologies, Inc., San Jose, CA (US)

(72) Inventors: Judah Gamliel Hahn, Ofra (IL); Ariel Navon, Revava (IL); Alexander Bazarsky, Holon (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/489,560

(22) Filed: Oct. 18, 2023

(65) Prior Publication Data
US 2025/0130716 A1   Apr. 24, 2025

(51) Int. Cl.
*G06F 12/00* (2006.01)
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
CPC .... G06F 3/0679; G06F 3/0685; G06F 3/0688; G06F 12/0238; G06F 12/0246; G06F 2212/2022; G06F 2212/2024; G06F 2212/205; G06F 2212/214; G06F 2212/2142; G06F 2212/2146; G06F 2212/217; G06F 2212/72; G06F 2212/7211; G06F 2212/7209; G06F 2212/7208; G06F 2212/7207; G06F 2212/7206; G06F 2212/7205; G06F 2212/7204; G06F 2212/7203; G06F 2212/7202; G06F 2212/7201; G11C 16/3495; G11C 16/349; G11C 13/0035; G11C 11/5685;
(Continued)

(56) References Cited

U.S. PATENT DOCUMENTS

| | | |
|---|---|---|
| 9,940,071 B2 | 4/2018 | Nemoto et al. |
| 10,761,978 B2 | 9/2020 | Hughes et al. |

(Continued)

FOREIGN PATENT DOCUMENTS

CN   108664213 A   10/2018

*Primary Examiner* — Arvind Talukdar
(74) *Attorney, Agent, or Firm* — PATTERSON + SHERIDAN, LLP

(57) ABSTRACT

Instead of a system with no awareness to the specific properties of the described system files, such as atomicity of different types of system files, utilize the special characteristics of the corresponding system files to optimize storage handling. A host marks a certain logical block address (LBA) range as belonging to an atomic file. That entire range will be treated as a single atomic unit. Conversely, an LBA range being used to append to a log file may have very small atomic units, allowing for incremental updates without changing the atomicity of the rest of the media. When a write command is passed, the write command will have a certain length. Depending on the length of the write command, the device can disassemble the write command into smaller write sectors of the smallest possible write portion. The device will then write the small write portions to a storage location, while keeping an atomic principle of each of the small write portions.

11 Claims, 5 Drawing Sheets

(58) Field of Classification Search
CPC ............ G11C 11/5678; G11C 11/5671; G11C 11/5664; G11C 11/5657; G11C 11/5642; G11C 11/5635; G11C 11/5628; G11C 11/5621; G11C 11/5614
See application file for complete search history.

(56) References Cited

U.S. PATENT DOCUMENTS

| | | |
|---|---|---|
| 10,810,157 B1* | 10/2020 | Paterra .................... G06F 3/067 |
| 2014/0325125 A1 | 10/2014 | Kwon et al. |
| 2015/0113326 A1* | 4/2015 | Talagala .............. G06F 11/2094 714/24 |
| 2019/0163651 A1* | 5/2019 | Kowles ................... G06F 3/061 |
| 2023/0205457 A1 | 6/2023 | Porzio et al. |

* cited by examiner

| Bit | Description |
|---|---|
| 01 | Attribute – Integral Dataset for Write (IDW): If set to '1', then the dataset should be optimized for write access as an integral unit. The host expects to perform operations on all ranges provided as an integral unit for writes, indicating that if a portion of the dataset is written it is expected all of the ranges in the dataset are going to be written. |
| 00 | Attribute – Integral Dataset for Read (IDR): If set to '1', then the dataset should be optimized for read access as an integral unit. The host expects to perform operations on all ranges provided as an integral unit for reads, indicating that if a portion of the dataset is read it is expected all of the ranges in the dataset are going to be read. |

SSD OPTIMIZATION AWARENESS TO ATOMICITY OF DIFFERENT SYSTEM FILES

BACKGROUND OF THE DISCLOSURE

Field of the Disclosure

Embodiments of the present disclosure generally relate to improving optimization of storage for system files.

Description of the Related Art

Host operating environments have files of distinct types, each type with specific properties. Some examples of files with special handling include atomic files, log files, and temporary files. An atomic file is one which is always written all at once, and may be replaced, but not updated. When an application writes a new atomic file, the old file remains. Only when the new file is finished writing, the old file is replaced. If a crash or any type of abort occurs during the new file write, the old file will remain, and the new file is dropped.

Log files belong to another type of system files. This type of file can provide historical record of everything and anything that happens within a system. This includes events such as transactions, errors, and intrusions. Log files are typically written in "append only" mode. On a crash case, files are guaranteed to be intact, up to some "write boundary" point. The last write portion may be lost due to the crash, but all the existing log file shouldn't contain any non-related junk data.

Temporary files are generally discarded when applications terminate (not necessarily correlated to storage device reset). These files are general purpose and used by applications, but do not have a long expected lifetime. At present, storage devices are completely unaware of the characteristics of files being stored in a file system. File extents are converted into logical block address (LBA) ranges on the host. While there is a hinting mechanism in the non-volatile memory express (NVMe) that allows host file systems to mark LBA ranges with various attributes, this feature is not widely used. This is due to storage devices do not currently implement any special handling based on file characteristics.

There is a need in the art for improving atomicity depending on file type as communicated.

SUMMARY OF THE DISCLOSURE

Instead of a system with no awareness to the specific properties of the described system files, such as atomicity of different types of system files, utilize the special characteristics of the corresponding system files to optimize storage handling. A host marks a certain logical block address (LBA) range as belonging to an atomic file. That entire range will be treated as a single atomic unit. Conversely, an LBA range being used to append to a log file may have very small atomic units, allowing for incremental updates without changing the atomicity of the rest of the media. When a write command is passed, the write command will have a certain length. Depending on the length of the write command, the device can disassemble the write command into smaller write sectors of the smallest possible write portion. The device will then write the small write portions to a storage location, while keeping an atomic principle of each of the small write portions.

In one embodiment, a data storage device comprises: a memory device, and a controller coupled to the memory device, wherein the controller is configured to: define a system logical block address (LBA) range with an atomicity configuration; receive aggregated atomic write chunks in a single command; disassemble the command; and return a status to a host device.

In another embodiment, a data storage device comprises: a memory device; and a controller coupled to the memory device, wherein the controller is configured to: receive an assembled write command at a write module; disassemble the assembled write command at the write module; pass the disassembled write command to a write module; and write data of the disassembled write command to the memory device.

In another embodiment, a data storage device comprises: means to store data; and a controller coupled to the means to store data, wherein the configured to: receive a plurality of writes commands that are a first size, wherein the plurality of write commands are received as a single write command of a second size that is bigger than the first size; treat the single write command as a write stream to a corresponding logical block address (LBA) range; disassemble the single write command into the plurality of write commands; and write data associated with the plurality of write commands to the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a block diagram illustrating a table for a dataset management command, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of a system with no awareness to the specific properties of the described system files, such as atomicity of different types of system files, utilize the special characteristics of the corresponding system files to optimize storage handling. A host marks a certain logical block address (LBA) range as belonging to an atomic file. That entire range will be treated as a single atomic unit. Conversely, an LBA range being used to append to a log file may have very small atomic units, allowing for incremental updates without changing the atomicity of the rest of the media. When a write command is passed, the write command will have a certain length. Depending on the length of the write command, the device can disassemble the write command into smaller write sectors of the smallest possible write portion. The device will then write the small write portions to a storage location, while keeping an atomic principle of each of the small write portions.

Figure 1:
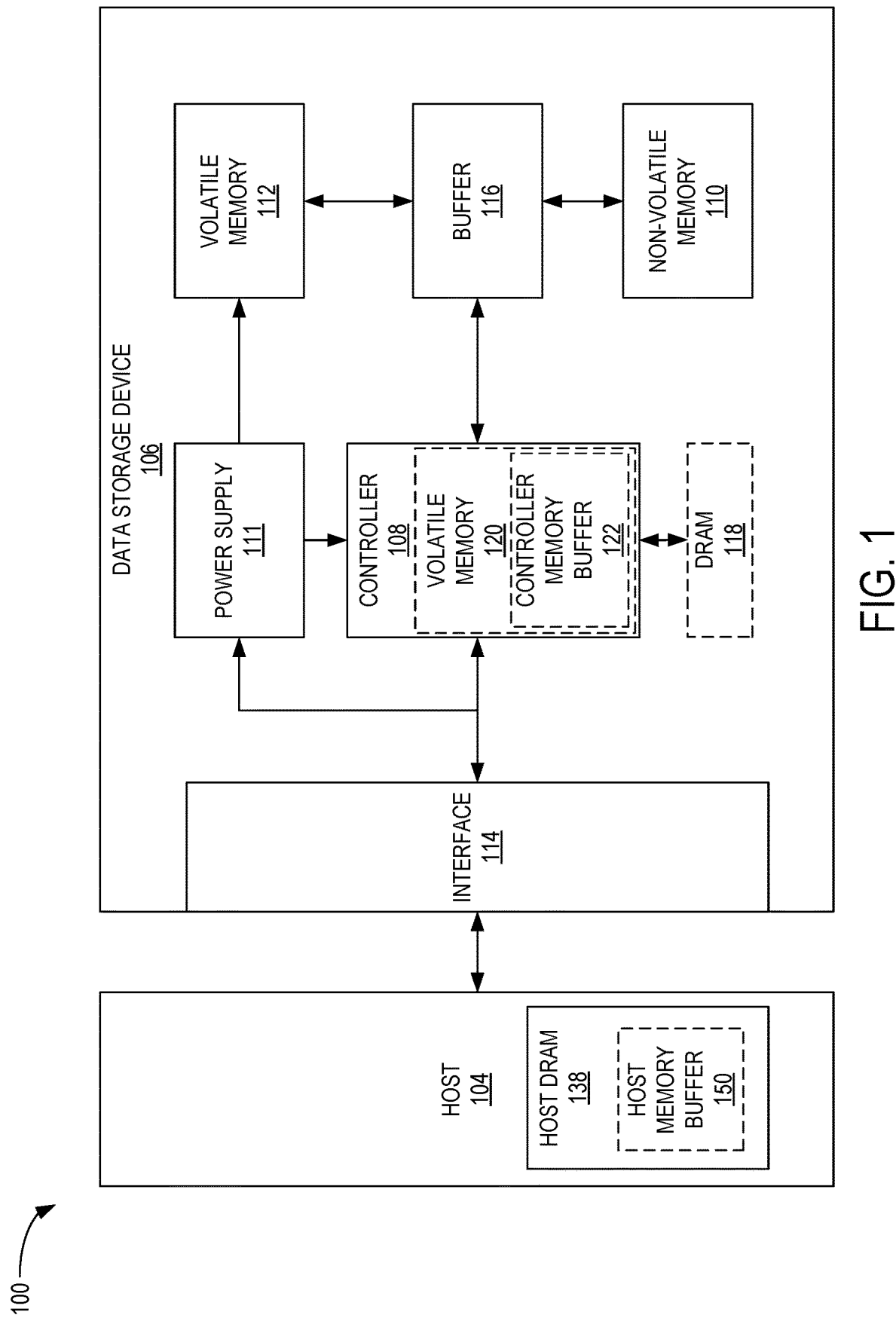
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Previously, there was no awareness from the memory device point of view to the specific properties of system files, such as atomicity of different types of system files and as such, the system files were treated like any other host file. As will be discussed herein, a method for optimization of storage of system files is proposed. The method will utilize the special characteristics of the corresponding system files (e.g., either log or atomic files) in order to optimize the storage handling procedure. Typically, atomicity is a namespace level or device level constant. As will be discussed herein, variable atomicity is deployed depending on the file type as communicated by the host. For example, if a host marks a certain LBA range as belonging to an atomic file, that entire range will be treated as a single atomic unit. Conversely, an LBA range being used to append to a log file may have very small atomic units, allowing for incremental updates without changing the atomicity of the rest of the media.

The method relies on the atomicity of the update of log and atomic files. When a write command is passed, the write command will have a certain length. For example, the write command could be chunks of 4 KB or 16 Kb depending on the file system. The data storage device can then disassemble the write command into smaller write sectors of the smallest possible write portion. Then, the data storage device can write the small portions to the storage medium (i.e., memory device or NAND) while keeping the atomic principle of each of the portions. In case there is a write failure, the data storage device may keep the written part of the data if the data corresponds to the host definition of atomicity. For example, the command is to write 256 KB but actually the atomicity should be kept on a 4 KB level. In this setting, the host can fuse the smaller atomic write commands into a longer command and only pass the write command once. The data storage device will treat the write command as an atomic write stream with the correct configuration if done into the corresponding LBA range. The result will be a reduced overhead and improvement in performance when writing the corresponding files.

Figure 2:
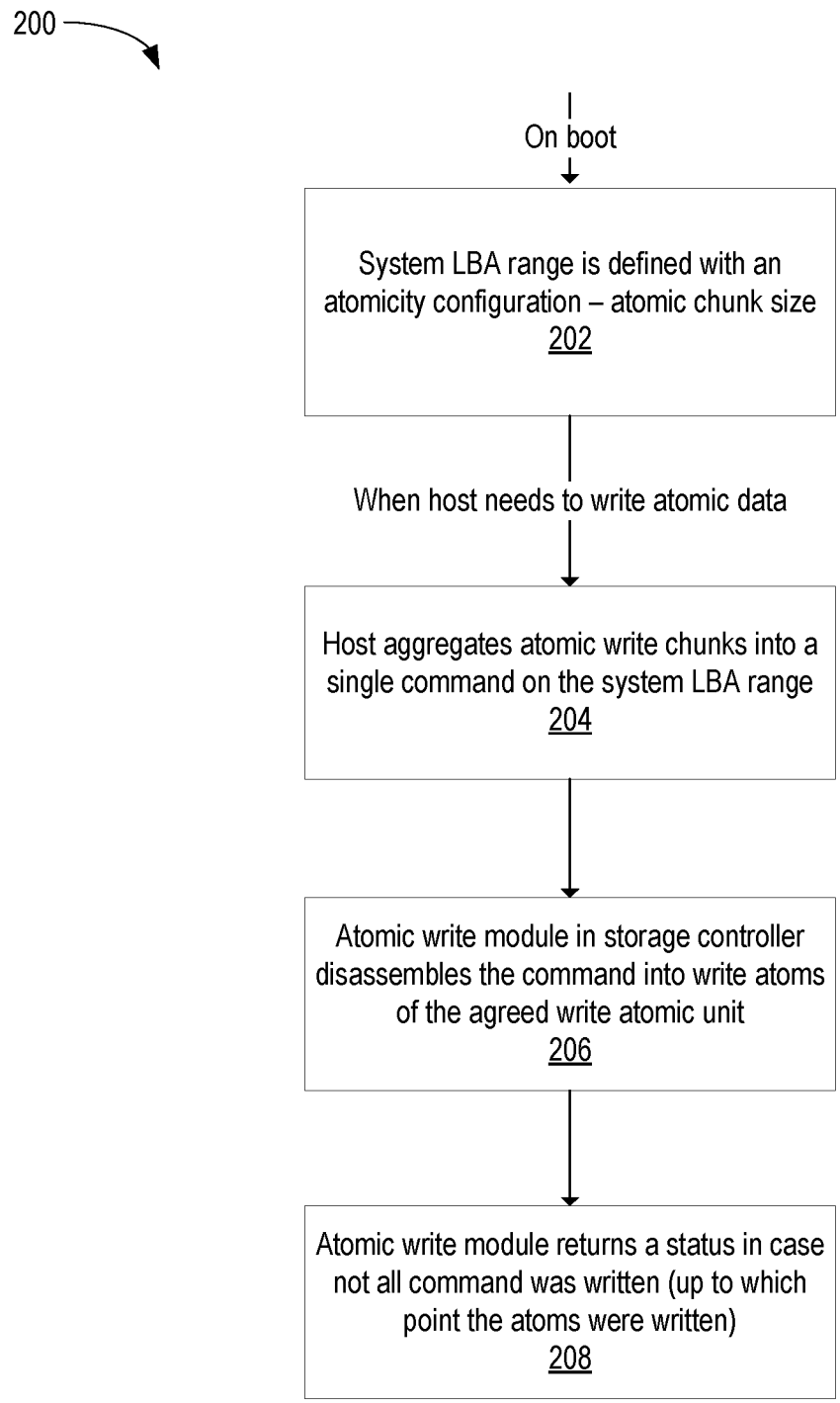
FIG. 2 is a flowchart illustrating a method for optimization of storage of system files, according to certain embodiments.

FIG. 2 is a flowchart illustrating a method 200 for optimization of storage of system files, according to certain embodiments. The method 200 begins on boot at block 202. At block 202, the system LBA range is defined with an atomicity configuration (atomic chunk size). At block 204, when the host needs to write atomic data, the host aggregates atomic write chunks into a single command on the system LBA range. At block 206, the atomic write module in the storage controller disassembles the command into write atoms of the agreed write atomic unit. At block 208, the atomic write module returns a status in case not all of the command was written (up to which point the atoms were written).

Figure 3:
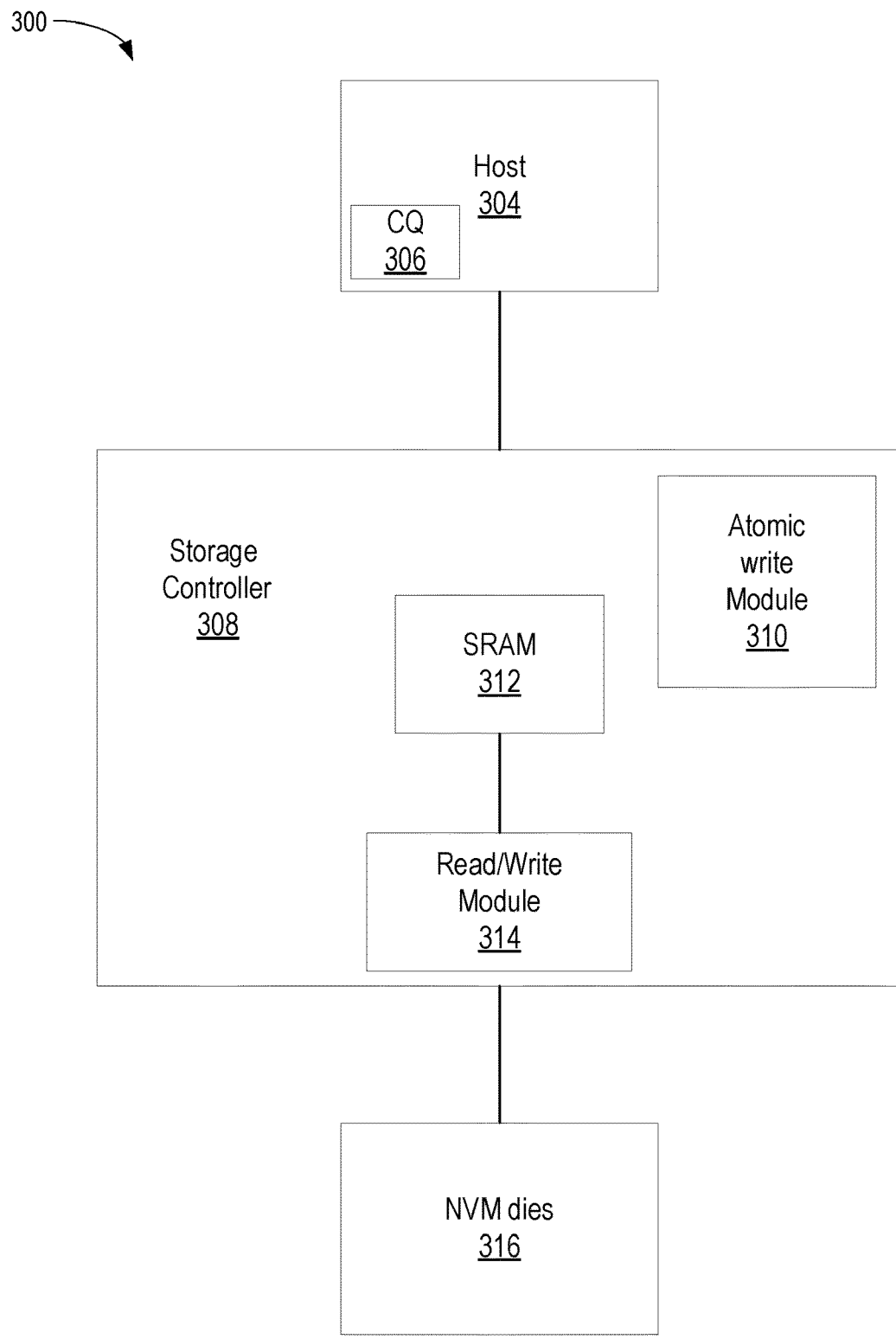
FIG. 3 is a block diagram illustrating a system for optimization of storage of system files, according to certain embodiments.

FIG. 3 is a block diagram illustrating a system 300 for optimization of storage of system files, according to certain embodiments. The system 300 comprises a host 304, a storage controller 308, and NVM dies 316. The host 304 comprises a command queue (CQ) 306. The storage controller 308 further comprises an atomic write module 310, an SRAM 312, and a read/write module 314.

The host 304 modifies the commands in the CQ 306 such that the commands reflect the concatenated command. Then, the atomic write module 310 in the storage controller 308 will disassemble the commands and pass the commands to the read/write module 314. In case of write failure in one of the commands, the atomic write module 310 will ensure that the status is returned to the host 304. The host 304 can then roll back the changes that are related to the file that has failed to write.

FIG. 4 is a block diagram illustrating a table 400 for a dataset management command, according to certain embodiments. The host may specify atomic ranges using an NVMe dataset management command. In current implementations, the atomic unit is a global value for a namespace and is not affected by the dataset management command. While the current attributes as defined in the NVMe specification cannot be used as-is without breaking compatibility, a variant of these attributes can be defined which would enforce the behavior described.

The table 400 has a bit 01 with an attribute of integral dataset for write (IDW). If set to '1', then the dataset should be optimized for write access as an integral unit. The host expects to perform operations on all ranges provided as an integral unit for writes, indicating that if a portion of the dataset is written it is expected all of the ranges in the dataset are going to be written. Bit 00 has an attribute of integral dataset for read (IDR). If set to '1', then the dataset should be optimized for read access as an integral unit. The host expects to perform operations on all ranges provided as an integral unit for reads, indicating that if a portion of the dataset is read it is expected all of the ranges in the dataset are going to be read.

Figure 5:
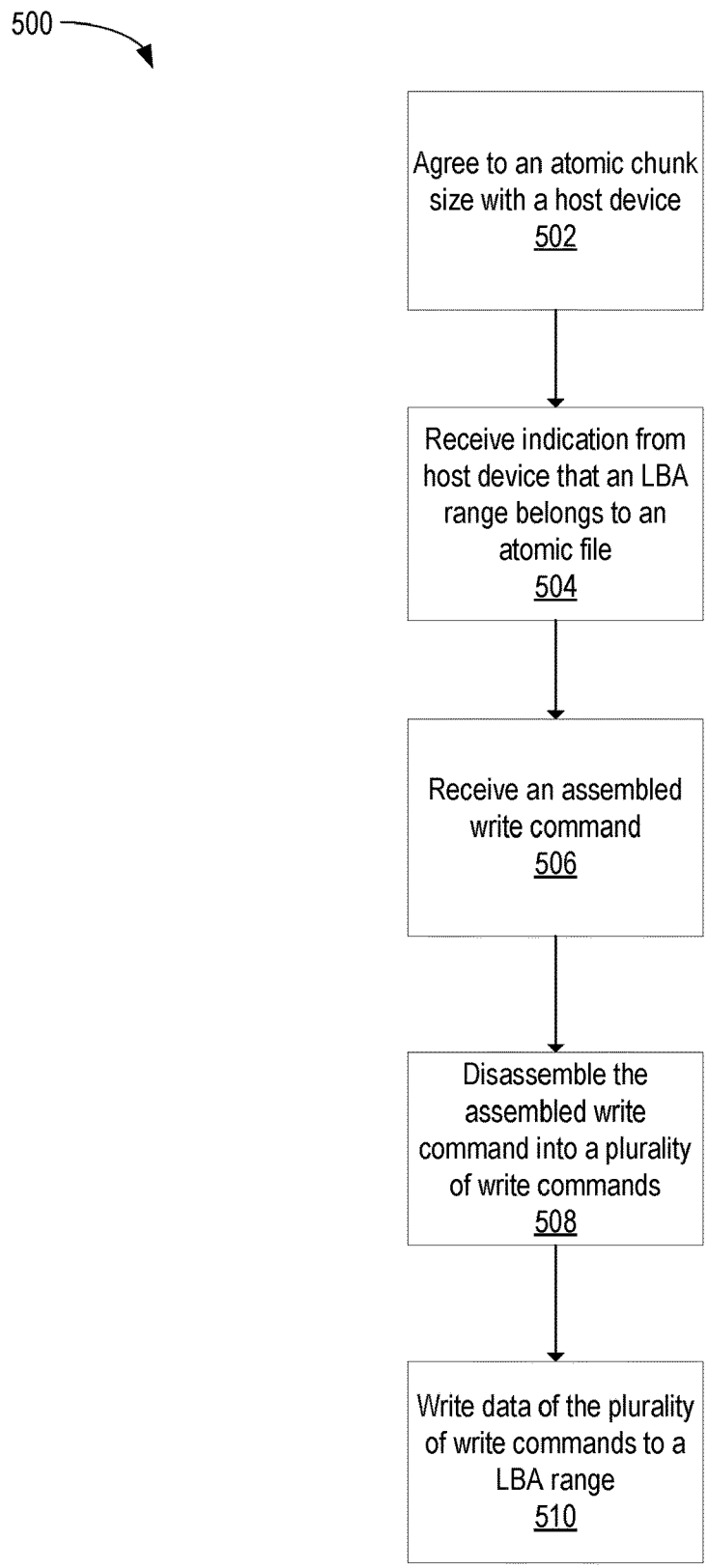
FIG. 5 is a flowchart illustrating a method for predefining an LBA range, according to certain embodiments.

FIG. 5 is a flowchart illustrating a method 500 for predefining an LBA range, according to certain embodiments. In automotive devices there may be cases when file utilize atomicity. Predefining an LBA range with atomic features will allow the atomic write module, such as read/write module 314 of FIG. 3, to disassemble commands that concern the corresponding LBA range. The atomic LBA range may be defined by the host during the device life, and similar principles may be applied to this LBA range by defining the atomic write chunk.

Storage optimization is primarily relevant for client-grade devices which do not have power loss protection (PLP). In a device with PLP, torn write handling is expected to be uniform, so storage optimization will have lower value but even there the size of the capacitor used in PLP flow could be optimized.

The method 500 begins at block 502. At block 502, the controller agrees to an atomic chunk size with a host device. At block 504, the controller receives an indication from host device that an LBA range belongs to an atomic file. At block 506, the controller receives an assembled write command. At block 508, the controller disassembles the assembled write command into a plurality of write commands. At block 510, the controller writes data of the plurality of write commands to a LBA range.

Using atomicity depending on file type will reduce power consumption. Responsiveness, QoS, and performance when handling system files will improve.

In one embodiment, a data storage device comprises: a memory device, and a controller coupled to the memory device, wherein the controller is configured to: define a system logical block address (LBA) range with an atomicity configuration; receive aggregated atomic write chunks in a single command; disassemble the command; and return a status to a host device. The controller is configured to agree with the host device on a write atomic unit. The single command is on the system LBA range. The disassembling comprises disassembling the command into write atoms of a write atomic unit. The command is a write command and wherein the controller is configured to execute the command. Less than all of the command is written. The controller includes an atomic write module. The atomic write module is configured to perform the disassembling. The controller is configured to receive atomic ranges specified by the host device, and wherein the atomic ranges are specified using a nonvolatile memory express (NVMe) dataset management command. The controller is configured to receive a definition of an atomic chunk size of the system LBA range.

In another embodiment, a data storage device comprises: a memory device; and a controller coupled to the memory device, wherein the controller is configured to: receive an assembled write command at a write module; disassemble the assembled write command at the write module; pass the disassembled write command to a write module; and write data of the disassembled write command to the memory device. The assembled write command is an atomic write command. The atomic write command has an atomic chunk size. The atomic chunk size is a size agreed to by the data storage device and a host device. The assembled write command is a concatenated command. The controller writes the data while keeping an atomic principle of each portion written. The assembled write command is to write a first size and wherein the disassembled write command has an atomicity of a second size that is less than the first size.

In another embodiment, a data storage device comprises: means to store data; and a controller coupled to the means to store data, wherein the configured to: receive a plurality of writes commands that are a first size, wherein the plurality of write commands are received as a single write command of a second size that is bigger than the first size; treat the single write command as a write stream to a corresponding logical block address (LBA) range; disassemble the single write command into the plurality of write commands; and write data associated with the plurality of write commands to the means to store data. The plurality of write commands are log files. The LBA range is treated as a single atomic unit.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   define a system logical block address (LBA) range as belonging to an atomic file as defined by a host device;
   agree to an atomic chunk size with the host device;
   receive aggregated atomic chunks in a single command that belong to the system LBA range;
   disassemble the command into a plurality of write commands of the agreed atomic chunk size;
   write data for the plurality of write commands to the system LBA range; and
   return a status to a host device.

2. The data storage device of claim 1, wherein the command is a write command and wherein the controller is configured to execute the command.

3. The data storage device of claim 2, wherein less than all of the command is written.

4. The data storage device of claim 1, wherein the controller includes an atomic write module.

5. The data storage device of claim 4, wherein the atomic write module is configured to perform the disassembling.

6. The data storage device of claim 1, wherein the controller is configured to receive atomic ranges specified by the host device, and wherein the atomic ranges are specified using a nonvolatile memory express (NVMe) dataset management command.

7. A data storage device, comprising:
   a memory device; and
   a controller coupled to the memory device, wherein the controller is configured to:
   receive an assembled write command at a write module, wherein the assembled write command is for an atomic file to a logical block address (LBA) range specified by a host device and treated as a single atomic unit;
   disassemble the assembled write command at the write module into a plurality of write commands at an agreed upon atomic chunk size;
   pass the disassembled write command to a write module; and
   write data of the disassembled write command to the memory device.

8. The data storage device of claim 7, wherein the assembled write command is a concatenated command.

9. The data storage device of claim 7, wherein the controller writes the data while keeping an atomic principle of each portion written.

10. The data storage device of claim 9, wherein the assembled write command is to write a first size and wherein the disassembled write command has an atomicity of a second size that is less than the first size.

11. A data storage device, comprising:
    means to store data; and
    a controller coupled to the means to store data, wherein the controller is configured to:
    receive a plurality of writes commands that are a first size, wherein the plurality of write commands are received as a single write command of a second size that is bigger than the first size, wherein the single write command is for a logical block address (LBA) range belonging to an atomic file as defined by a host device;
    disassemble the single write command into the plurality of write commands at an agreed upon atomic chunk size; and
    write data associated with the plurality of write commands to the means to store data.

* * * * *